US011353760B2

(12) United States Patent
Cheng

(10) Patent No.: US 11,353,760 B2
(45) Date of Patent: Jun. 7, 2022

(54) PIXEL STRUCTURE AND PIXEL CONTROL METHOD, ARRAY SUBSTRATE AND DISPLAY DEVICE

(71) Applicant: BOE TECHNOLOGY GROUP CO., LTD., Beijing (CN)

(72) Inventor: Hongfei Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 541 days.

(21) Appl. No.: 16/344,543

(22) PCT Filed: Nov. 20, 2018

(86) PCT No.: PCT/CN2018/116469
§ 371 (c)(1),
(2) Date: Apr. 24, 2019

(87) PCT Pub. No.: WO2019/205602
PCT Pub. Date: Oct. 31, 2019

(65) Prior Publication Data
US 2021/0373370 A1    Dec. 2, 2021

(30) Foreign Application Priority Data
Apr. 25, 2018    (CN) .......................... 201810380220.X

(51) Int. Cl.
*G02F 1/1368*    (2006.01)
*G02F 1/1362*    (2006.01)

(52) U.S. Cl.
CPC ...... *G02F 1/1368* (2013.01); *G02F 1/136213* (2013.01); *G02F 1/136286* (2013.01)

(58) Field of Classification Search
CPC ............. G02F 1/1368; G02F 1/136213; G02F 1/136286
See application file for complete search history.

(56) References Cited

U.S. PATENT DOCUMENTS 9,430,975 B2    8/2016    Yao et al.
9,685,130 B2    6/2017    Lee et al.
(Continued)

FOREIGN PATENT DOCUMENTS

CN    101021660 A    8/2007
CN    101546075 A    9/2009
(Continued)

OTHER PUBLICATIONS

CN 101546075 A (Wang, Xian-Jun et al.) translation (Year: 2009).*
(Continued)

*Primary Examiner* — James A Dudek
(74) *Attorney, Agent, or Firm* — WHDA, LLP

(57) ABSTRACT

A pixel structure includes a first sub-pixel that includes a first thin film transistor (T1), a first common electrode (C1), and a first pixel electrode (Pix1) that is coupled to the first thin film transistor (T1); a second sub-pixel that includes a second thin film transistor (T2), a second common electrode (C2), and a second pixel electrode (Pix2) that is coupled to the second thin film transistor (T2); a discharge device that includes a control terminal, an input terminal, and an output terminal; and a gate line (GATE). The first thin film transistor (T1), the second thin film transistor (T2), and the control terminal of the discharge device are coupled to the gate line (GATE).

19 Claims, 6 Drawing Sheets

(56) References Cited

U.S. PATENT DOCUMENTS

| 9,897,833 | B2 | 2/2018 | Huang | |
|---|---|---|---|---|
| 2016/0377928 | A1* | 12/2016 | Park | G03F 1/36 349/46 |
| 2017/0003542 | A1 | 1/2017 | Park et al. | |

FOREIGN PATENT DOCUMENTS

| CN | 103353697 A | 10/2013 |
|---|---|---|
| CN | 104267554 A | 1/2015 |
| CN | 106249490 A | 12/2016 |
| CN | 107121863 A | 9/2017 |
| CN | 107255894 A | 10/2017 |
| CN | 108563080 A | 9/2018 |
| JP | 3891846 B2 | 3/2007 |

OTHER PUBLICATIONS

International Search Report dated Feb. 11, 2019, issued in counterpart application No. PCT/CN2018/116469. (12 pages).
Office Action dated Mar. 4, 2020, issued in counterpart CN Application No. 201810380220 X, with English translation (13 pages).

* cited by examiner

PIXEL STRUCTURE AND PIXEL CONTROL METHOD, ARRAY SUBSTRATE AND DISPLAY DEVICE

CROSS-REFERENCE TO RELATED APPLICATIONS

This application claims benefit of the filing date of Chinese Patent Application No. 201810380220.X filed on Apr. 25, 2018, the disclosure of which is hereby incorporated in its entirety by reference.

TECHNICAL FIELD

The present disclosure generally relates to display technology, and in particular, to a pixel structure, a pixel control method, an array substrate containing pixel structure, and a display device containing array substrate.

BACKGROUND

Liquid crystal display is a type of flat panel display that has excellent characteristics, including high resolution, thinness, light weight, and low power consumption. The dominance of liquid crystal displays in the market is further bolstered by improvements in display performance and production capacity, not to mention price competitiveness against other types of display devices.

BRIEF SUMMARY

One embodiment of the present disclosure is a pixel structure. The pixel structure may comprise a first sub-pixel comprising a first thin film transistor, a first common electrode, and a first pixel electrode that is coupled to the first thin film transistor; a second sub-pixel comprising a second thin film transistor, a second common electrode, and a second pixel electrode that is coupled to the second thin film transistor; a discharge device comprising a control terminal, an input terminal, and an output terminal; and a gate line. In at least some embodiments, the first thin film transistor, the second thin film transistor, and the control terminal of the discharge device may be coupled to the gate line. In at least some embodiments, the gate line nay be configured to control the first thin film transistor, the second thin film transistor, and the discharge device to operate in a concerted manner. In at least some embodiments, a pixel voltage of the first pixel electrode may be configured to be smaller than a pixel voltage of the second pixel electrode.

In at least some embodiments, the output terminal of the discharge device may be electrically coupled to the first common electrode to form a first charge-receiving device. The output terminal of the discharge device may be electrically coupled to the second common electrode to form a second charge-receiving device. The pixel structure may be configured to cause the first pixel electrode to discharge partially to the first charge-receiving device and the second charge-receiving device.

In at least some embodiments, the discharge device may be a third thin film transistor.

In at least some embodiments, the first charge-receiving device may be a first shunt capacitor, and the second charge-receiving device may be a second shunt capacitor.

In at least some embodiments, the first sub-pixel may further comprise a liquid crystal capacitor, and a sum of a capacitance of the first shunt capacitor and a capacitance of the second shunt capacitor may be smaller than a capacitance of the liquid crystal capacitor.

In at least some embodiments, a capacitance of the first shunt capacitor may be the same as a capacitance of the second shunt capacitor.

In at least some embodiments, an on-current of the first thin film transistor may be greater than an on-current of the discharge device.

In at least some embodiments, the first thin film transistor may be coupled to the gate line via a first gate electrode of the first thin film transistor. The second thin film transistor may be coupled to the gate line via a second gate electrode of the second thin film transistor.

In at least some embodiments, an input terminal of the first thin film transistor and an input terminal of the second thin film transistor may be coupled to a same signal line of the pixel structure.

In at least some embodiments, each of the first common electrode and the second common electrode may comprise at least one horizontal arm and at least one vertical arm. At least one horizontal arm may extend in a direction parallel to an extension direction of the gate line. At least one vertical arm may extend in a direction parallel to an extension direction of the signal line.

In at least some embodiments, the output terminal of the discharge device may be electrically coupled to the at least one horizontal arm of the first common electrode to form a first charge-receiving device. The output terminal of the discharge device may be electrically coupled to the at least one horizontal arm of the second common electrode to form a second charge-receiving device.

In at least some embodiments, the pixel structure may further comprise a first insulating layer between the output terminal of the discharge device and the first common electrode, and a second insulating layer between the output terminal of the discharge device and the second common electrode.

In at least some embodiments, the gate line, the first common electrode, and the second common electrode may each be composed of a metal material selected from the group consisting of copper, aluminum, molybdenum, titanium, chromium, tungsten, and an alloy thereof.

In at least some embodiments, the first pixel electrode and the second pixel electrode may each be composed of a transparent electrically conductive material.

Another embodiment of the present disclosure is an array substrate. The array substrate may comprise a pixel structure as described above.

In at least some embodiments, the array substrate may comprise a plurality of the pixel structures arranged in rows, and in each row of the pixel structures, the first sub-pixels of the pixel structures are arranged in one row, and the second sub-pixels of the pixel structures are arranged in another row.

In at least some embodiments, the pixel structures may be arranged so that in a column, the first sub-pixels in one row of the pixel structures are adjacent to the second sub-pixels in the adjacent row of the pixel structures.

Another embodiment of the present disclosure is a display device. The display device may comprise an array substrate as described above.

Another embodiment of the present disclosure is a method of controlling a pixel structure. The pixel structure may be as described above. The method ma comprise activating the first thin film transistor and the second thin film transistor into a conducting state, and turning on the discharge device; charging the first pixel electrode and the second pixel electrode using the first thin film transistor and the second thin film transistor, respectively; and causing the first pixel electrode to discharge partially to a first charge-receiving device and a second charge-receiving device, so that the pixel voltage of the first pixel electrode is smaller than the pixel voltage of the second pixel electrode.

In at least some embodiments, the method may further comprise storing the partial discharge from the first pixel electrode in the first charge-receiving device and the second charge-receiving device.

In at least some embodiments, the method may further comprise releasing the partial discharge from the first pixel electrode to the first common electrode and the second common electrode.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the present disclosure are apparent from the following detailed description taken in conjunction with the accompanying drawings in which:

Figure 1:
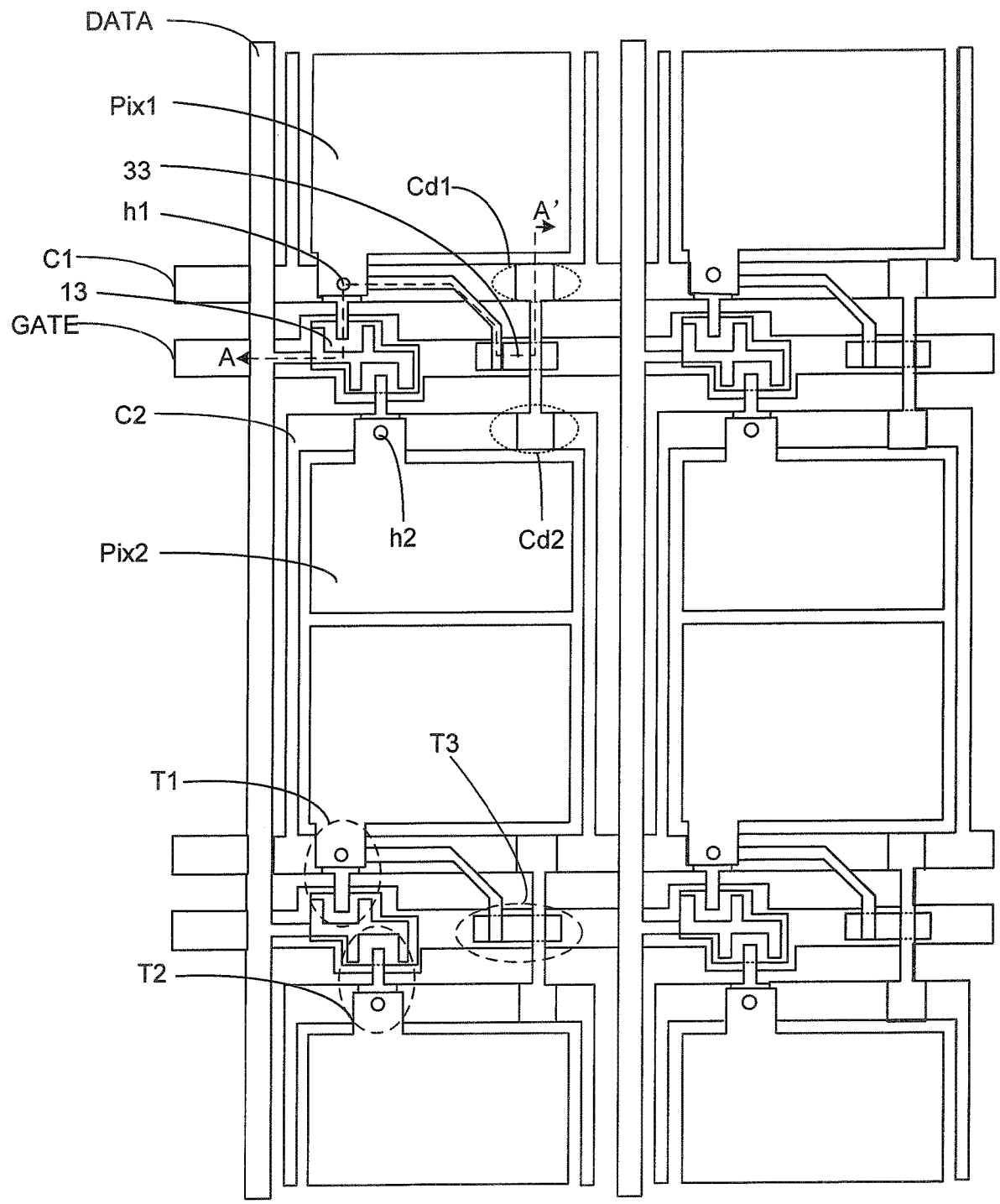
FIG. 1 shows a schematic diagram of a top view of a pixel structure according to an embodiment of the present disclosure.

The various features of the drawings are not to scale as the illustrations are for clarity in facilitating one skilled in the art in understanding the invention in conjunction with the detailed description.

DETAILED DESCRIPTION

Next, the embodiments of the present disclosure will be described clearly and concretely in conjunction with the accompanying drawings, which are described briefly above. The subject matter of the present disclosure is described with specificity to meet statutory requirements. However, the description itself is not intended to limit the scope of this disclosure. Rather, the inventors contemplate that the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiments for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

A numerical range modified by "approximately" herein means that the upper and lower limits of the numerical range can vary by 10% thereof. A number modified by "approximately" herein means that the number can vary by 10% thereof.

A liquid crystal display generally includes an array substrate and a color filter substrate, with a liquid crystal layer sandwiched between the array substrate and the color film substrate. The liquid crystal layer contains liquid crystal molecules. Thin film transistors on the array substrate are configured to control the orientation of the liquid crystal molecules, so that the liquid crystal layer can modulate the backlight and an image can be generated on the display.

The array substrate generally includes a plurality of pixel structures. A conventional pixel structure includes a first sub-pixel, a second sub-pixel, and a discharge device. The discharge device is configured to discharge the sub-pixel electrode of the first sub-pixel, causing the voltage of the first sub-pixel to be smaller than the voltage of the second sub-pixel. As a result, the liquid crystal molecules in the portion of the liquid crystal layer corresponding to the pixel structure are oriented in two directions, and the resulting display on the display device utilizing the array substrate is uniform from different viewing angles. Viewing angle characteristics in a straight-on viewing state are substantially the same as those in an oblique viewing state.

However, when the discharge device is used to discharge the first sub-pixel, the charge released by the first sub-pixel is usually stored in a shunt capacitor associated with the sub-pixel electrode. However, when storing charges, the shunt capacitor can cause the voltage of the sub-pixel electrode to fluctuate, thus affecting the quality of the display generated on the display device.

FIGS. 1, 2, 4, and 5 shows schematic diagrams of pixel structures according to embodiments of the present disclosure.

The pixel structure comprises a first sub-pixel (for example, a charge-discharge sub-pixel), a second sub-pixel (for example, a display sub-pixel), and a discharge device.

The first sub-pixel comprise a first thin film transistor T1, a first common electrode C1, a first pixel electrode Pix1, and a first liquid crystal capacitor Clc1. The first thin film transistor T1 has an input terminal and an output terminal. The first thin film transistor T1 comprises a first gate electrode 11, a first gate insulating layer 12, a first active layer 13, a first source electrode 14, a first drain electrode 15, and a first passivation layer 16. The first pixel electrode Pix1 of the first sub-pixel is coupled to the output terminal of the first thin film transistor T1.

The second sub-pixel comprises a second thin film transistor T2, a second common electrode C2, a second pixel electrode Pix2, and a second liquid crystal capacitor Clc2. The second thin film transistor T2 has an input terminal and an output terminal. The second thin film transistor T2 comprises a second gate electrode, a second gate insulating layer, a second active layer, a second source electrode, a second drain electrode, and a second passivation layer. The second pixel electrode Pix2 of the second sub-pixel is coupled to the output terminal of the second thin film transistor T2.

Figure 2:
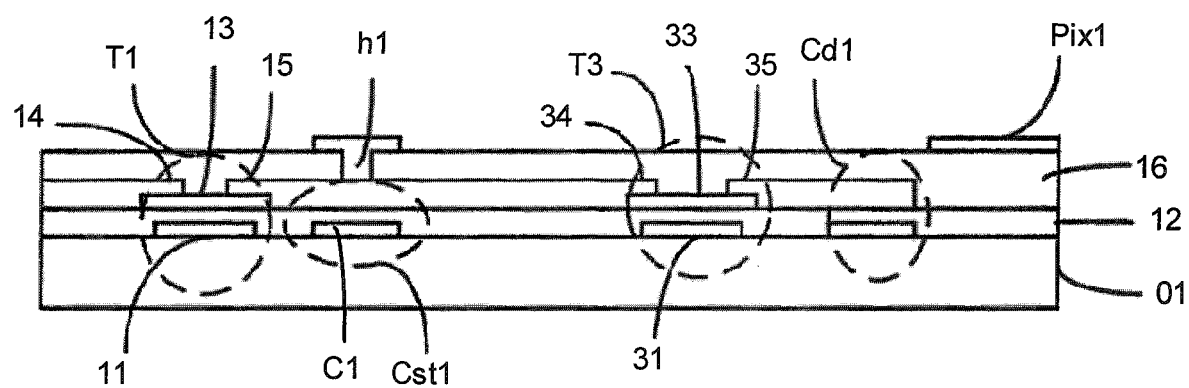
FIG. 2 shows a schematic cross-sectional diagram of the embodiment illustrated in FIG. 1 along the line A-A'.
Figure 5:
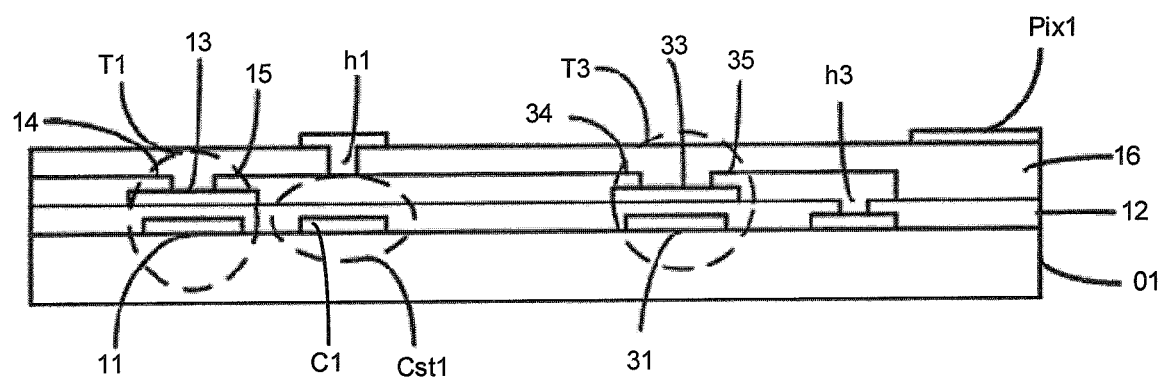
FIG. 5 shows a schematic cross-sectional diagram of the embodiment illustrated in FIG. 4 along the line B-B'.

The discharge device comprises an input terminal, an output terminal, and a control terminal. In some embodiments, the discharge device may be a third thin film transistor T3. The third thin film transistor T3 may comprise a third gate electrode 31, a third active layer 33, a third source electrode 34, and a third drain electrode 35, for example, as shown in FIGS. 2 and 5.

The first gate electrode 11 of the first thin film transistor T1, the second gate electrode of the second thin film transistor T2, and the control terminal of the discharge device are each coupled to the same gate line GATE.

The input terminal of the discharge device is coupled to the output terminal of the first thin film transistor T1.

The output terminal of the discharge device and the first common electrode C1 constitute the first charge-receiving device. The first charge-receiving device may be configured to receive and store discharge from the first pixel electrode Pix1, or receive and release the discharge without first storing. In some embodiments, the first charge-receiving device comprises a first capacitor, and in particular, a first shunt capacitor Cd1.

The output terminal of the discharge device and the second common electrode C2 constitute the second charge-receiving device. The second charge-receiving device may be configured to receive and store discharge from the second pixel electrode Pix2, or receive and release the discharge without first storing. In some embodiments, the second charge-receiving device comprises a second capacitor, and in particular, a second shunt capacitor Cd2.

The pixel structure according to the present disclosure includes a sub-pixel structure. The first thin film transistor T1, the second thin film transistor T2, and the discharge device are each coupled to the same gate line GATE. The gate line GATE, a signal line DATA, the first common electrode C1, and the second common electrode C2 may each be composed of a metal material, including copper (Cu), aluminum (Al), molybdenum (Mo), titanium (Ti), chromium (Cr), tungsten (W), and the like, or an alloy comprising at least one of those metal materials.

The gate line GATE, the data line DATA, and the first and second common electrodes C1, C2 may each comprise at least one layer. For example, the gate line GATE, the signal line DATA, and the first and second common electrodes C1, C2 may each have a Mo/Al/Mo three-layer structure, a Ti/Cu/Ti three-layer structure, a Mo/Ti/Cu three-layer structure, and the like.

The first pixel electrode Pix1 and the second pixel electrode Pix2 may each comprise an electrically conductive material, and in particular, a transparent electrically conductive material. For example, the first pixel electrode Pix1 and the second pixel electrode Pix2 may each be composed of indium tin oxide, zinc oxide, or other transparent metal oxide conductive material.

The present disclosure provides a control method for the pixel structure described above.

In step S100, the gate line GATE forms a conducting path between the first thin film transistor T1 and the second thin film transistor T2. In addition, the discharge device is turned on.

In cases where the discharge device is to be turned on when the first thin film transistor T1 and the second thin film transistor T2 are activated, the first thin film transistor T1 and the second thin film transistor T2 may be of the same type.

The discharge device is in an "open" state when the first thin film transistor T1 and the second thin film transistor T2 are activated. For example, when the first thin film transistor T1 and the second thin film transistor T2 are both conducting in a low-voltage state, the gate line GATE is configured to provide a low-voltage scan signal, and the discharge device is turned on under a low voltage. On the other hand, when the first thin film transistor T1 and the second thin film transistor T2 are both conducting in a high-voltage state, the gate line GATE is configured to provide a high-voltage scan signal, and the discharge device is turned on under a high voltage.

In step S200, the first thin film transistor T1 charges the first pixel electrode Pix1. The second thin film transistor T2 charges the second pixel electrode Pix2.

The signal line DATA supplies a signal to the first thin film transistor T1 and the second thin film transistor T2. The first thin film transistor T1 transmits the signal to the first pixel electrode Pix1, thereby charging the first pixel electrode Pix1. Similarly, the second thin film transistor T2 transmits the signal to the second pixel electrode Pix2, thereby charging the second pixel electrode Pix2.

In addition, the first pixel electrode Pix1 is configured to discharge partially the charge that has been supplied by the first thin film transistor T1, to the first charge-receiving device and the second charge-receiving device via the first thin film transistor T1 and the discharge device. As a result, the first pixel electrode Pix1 has a smaller pixel voltage than the second pixel electrode Pix2. Since the first thin film transistor T1, the second thin film transistor T2, and the discharge device are coupled to the same gate line GATE, they may be configured to act in a concerted manner, that is, discharge and/or charge simultaneously.

In the pixel structure and pixel control method according to the present disclosure, the first gate electrode 11 of the first thin film transistor T1, the second gate electrode of the second thin film transistor T2, and the control terminal of the discharge device are each coupled to the same gate line GATE.

The output terminal of the discharge device and the first common electrode C1 of the first sub-pixel form the first charge-receiving device, and the output terminal of the discharge device and the second common electrode C2 of the second sub-pixel form the second charge-receiving device. These configurations make it possible for the first thin film transistor T1, the second thin film transistor T2, and the discharge device to be controlled in a concerted manner, so that when the pixel structure is being charged, scan signals from the same gate line GATE can activate the first thin film transistor T1 and the second thin film transistor T2 to be in a conducting state, and the discharge device to be turned on. The first pixel electrode Pix1 can release partial charge to the first charge-receiving device and the second charge-receiving device via the first thin film transistor T1 and the discharge device. This can ensure that the pixel voltage of the first pixel electrode Pix1 is smaller than the pixel voltage of the second pixel electrode Pix2.

Unlike conventional technologies, in the pixel structure according to the present disclosure, a first charge-receiving device may be formed by coupling the output terminal of the discharge device and the first common electrode C1, and a second charge-receiving device may be formed by coupling the output terminal of the discharge device and the second common electrode C2. These configurations allow charge to be partially released by the first sub-pixel, so as to reduce the amount of charge received by the first charge-receiving device between the output terminal of the discharge device and the first common electrode C1, and to minimize or eliminate the effects of the charge received by the first charge-receiving device on the pixel voltage of the first pixel electrode Pix1. In turn, the quality of the display can be guaranteed.

In some embodiments, the first charge-receiving device and the second charge-receiving device are configured so that the maximum charge that can be received collectively by the first and second charge-receiving devices is smaller than the capacitance of the first liquid crystal capacitor of the first sub-pixel (i.e., the maximum charge that the first liquid crystal capacitor can hold). This can prevent the first thin film transistor T1 from releasing completely the charge loaded by the first pixel electrode Pix1. In turn, under the control the scan signals from the gate line GATE, the charge from the first thin film transistor T1 is not completely released even though the discharge device remains turned on. In addition, the pixel voltage of the first pixel electrode Pix1, after charge by the first thin film transistor T1, is smaller than the pixel voltage of the second pixel electrode Pix2, after charge by the second thin film transistor T2. As a result, the pixel structure according to the present disclosure can be used to produce a display device that is capable of wide angle viewings.

In some embodiments, the discharge device may be configured so that, when the discharge device is in the "ON" state, the current flowing through the discharge device (that is, the "on-current" of the discharge device) is smaller than the current flowing through the first thin film transistor T1 in the "ON" state (that is, the "on-current" of the first thin film transistor). As a result, for the duration of the period when the gate line GATE is supplying scan signals, the charge released by the first pixel electrode Pix1 through the first thin film transistor T1 per unit time is less than the charge being charged into the first pixel electrode Pix1 through the first thin film transistor T1 per unit time. Even when the discharge device remains "ON", the charge in the first pixel electrode Pix1 is not completely discharged, and the pixel voltage of the first pixel electrode Pix1 can be reduced.

As shown in FIGS. 1 to 6, the first charge-receiving device and the second charge-receiving device of the present disclosure may be configured in a number of ways.

Figure 3:
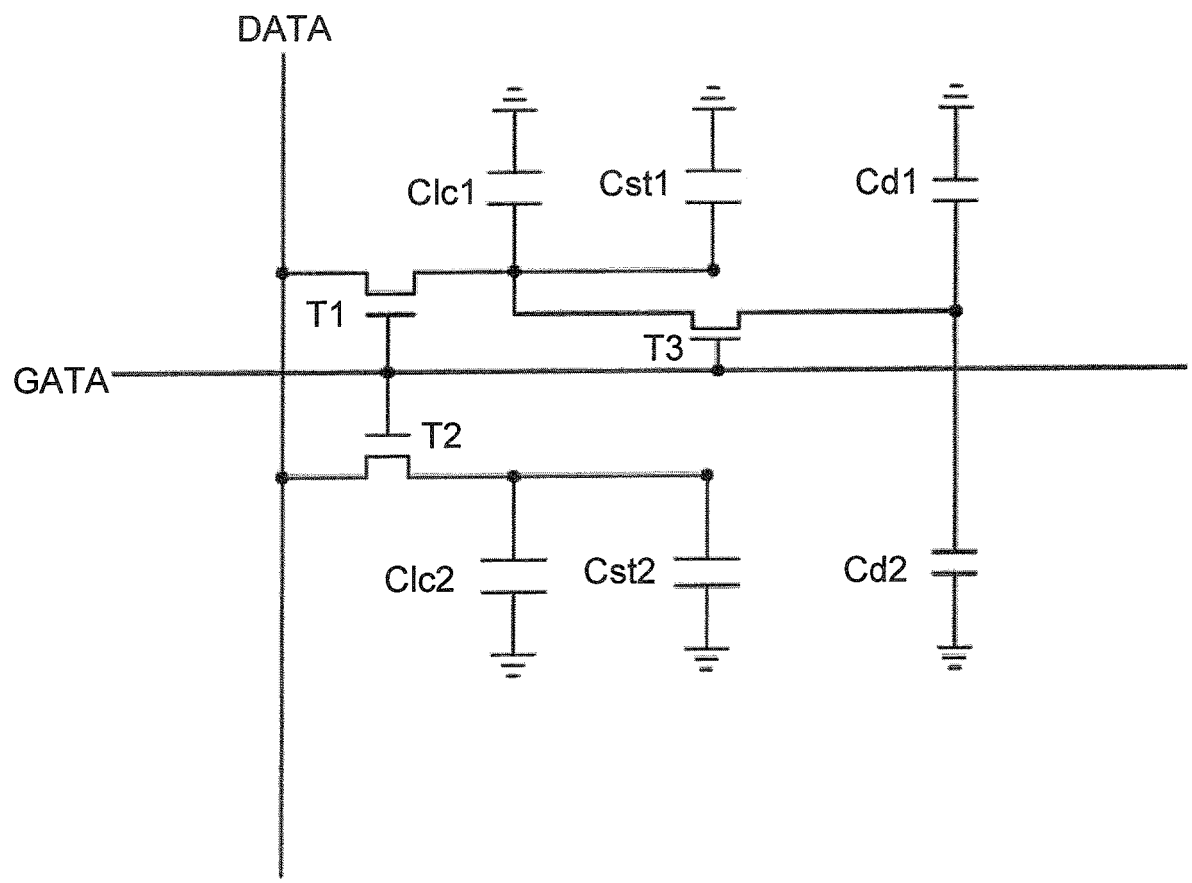
FIG. 3 shows a circuit diagram for a pixel structure according to an embodiment of the present disclosure.

FIG. 1 shows a schematic diagram of a top view of a pixel structure according to an embodiment of the present disclosure. FIG. 2 shows a schematic cross-sectional diagram of the embodiment illustrated in FIG. 1 along the line A-A'. FIG. 3 shows a circuit diagram for a pixel structure according to an embodiment of the present disclosure.

As shown in FIGS. 1 to 3, the output terminal of the discharge device and the first common electrode C1 of the first sub-pixel may constitute the first shut capacitor Cd1 of the first charge-receiving device. The output terminal of the discharge device and the second common electrode C2 of the second sub-pixel may constitute the second shunt capacitor Cd2 of the second charge-receiving device. The respective shunt capacitors of the first charge-receiving device and the second charge-receiving device are configured to divide the received charge into two portions, with each portion to be separately stored in the first shunt capacitor Cd1 or the second shunt capacitor Cd2.

The sum of the first capacitance of the first shunt capacitor Cd1 and the second capacitance of the second shunt capacitor Cd2 is smaller than the capacitance of the first liquid crystal capacitor of the first sub-pixel (i.e., the maximum charge that the first liquid crystal capacitor can hold). After the first shunt capacitor Cd1 and the second shunt capacitor Cd2 have been charged, the charge loaded onto the first pixel electrode Pix1 will not be completely released, even when the discharge device remains in the "ON" state.

In some embodiments, the first capacitance of the first shunt capacitor Cd1 is the same as the second capacitance of the second shunt capacitor Cd2. The first shunt capacitor Cd1 and the second shunt capacitor Cd2 can start receiving the discharge from the first pixel electrode Pix1 at the same time, and finish receiving the discharge from the first thin film transistor T1 at the same time. This can prevent a situation where one shunt capacitor is already fully charged, while the other shunt capacitor is still being charged. The first shunt capacitor Cd1 and the second shunt capacitor Cd2 can also remain in the state of receiving and storing charge for the entire duration of the discharge process by the first pixel electrode Pix1.

By configuring the first and second shunt capacitors Cd1, Cd2 to function in such a synchronized and concerted manner, the present disclosure can avoid the problem of defects in the display due to discharge from the first pixel electrode Pix1 and/or the unsynchronized storage of charge in the shunt capacitors Cd1, Cd2.

For example, if the first shunt capacitor Cd1 has a smaller capacitance than the second shunt capacitor Cd2, a situation may arise in which the first shunt capacitor Cd1 is fully charged, while the second shunt capacitor Cd2 is still being charged. The reverse may happen if the first shunt capacitor Cd1 has a larger capacitance than the second shunt capacitor Cd2.

In some embodiments, as shown in FIGS. 1 to 3, a first insulating layer is provided between the output terminal of the discharge device and the first common electrode C1. The first insulating layer constitutes the first capacitor. In some embodiments, the first capacitor may be a shunt capacitor. A second insulating layer is provided between the output terminal of the discharge device and the second common electrode C2. The second insulating layer constitutes the second capacitor. In some embodiments, the second capacitor may be a shunt capacitor.

The first insulating layer and the second insulating layer may separately be composed of any appropriate insulating material known to a person of ordinary skill in the art, including, but not limited to, tantalum nitride and tantalum oxide. The first insulating layer and the second insulating layer may have the same or different compositions.

The first insulating layer and the second insulating layer may each comprise at least one layer. For example, the first insulating layer and the second insulating layer may each have a single-layer structure, or a multilayer structure. The first insulating layer and the second insulating layer may have the same or different structures.

The first insulating layer and the second insulating layer may be formed separately from the other components of the pixel structure. In some embodiments, the first insulating layer may be a gate insulating layer or a passivation layer of the first thin film transistor T1. Similarly, the second insulating layer may be a gate insulating layer or a passivation layer of the second thin film transistor T2. Forming the first insulating layer and the second insulating layer out of the respective gate insulating layer or passivation layer of the first and second thin film transistor T1, T2 has the advantage of reducing the number of layers in the pixel structure, and avoiding increasing the thickness of the pixel structure.

The structure of the first thin film transistor T1 or the second thin film transistor T2 is not particularly limited, and may be configured in any appropriate manner known to a person of ordinary skill in the art. For example, the first thin film transistor T1 and/or the second thin film transistor T2 may be a bottom-gate thin film transistor or a top-gate thin film transistor, depending on the position of the respective gate electrode. The first thin film transistor T1 and/or the second thin film transistor T2 may be a p-type thin film transistor or a n-type thin film transistor, depending on the compositions of the component layers of the thin film transistor.

FIG. 1 shows a schematic diagram of a top view of a pixel structure according to an embodiment of the present disclosure. FIG. 2 shows a schematic cross-sectional diagram of the embodiment illustrated in FIG. 1 along the line A-A'. FIG. 3 shows a corresponding circuit diagram for the embodiment of the pixel structure.

FIGS. 1 to 3 also illustrate the relationship between the first thin film transistor T1 and the third thin film transistor T3, where the third thin film transistor T3 functions as a discharge device. The first thin film transistor T1 comprises a first gate electrode 11, a first gate insulating layer 12, a first active layer 13, a first source electrode 14, a first drain electrode 15, and a first passivation layer 16. The third thin film transistor T3 includes a third gate electrode 31, a third active layer 33, a third source electrode 34, and a third drain electrode 35.

The first gate electrode 11, the third gate electrode 31, and the first common electrode are provided in the same layer on the base substrate 01. The first gate insulating layer 12 is provided on the surface of the first gate electrode 11, the third gate electrode 31, and the first common electrode C1. The first active layer 13 and the third active layer 33 are provided in the same layer on the surface of the first gate insulating layer 12. The first source electrode 14 and the first drain electrode 15 are provided on the surfaces of the first active layer 13 and the first gate insulating layer 12. The third source electrode 34 and the third drain electrode 35 are provided on the surfaces of the third active layer 33 and the first gate insulating layer 12. The first drain electrode 15 and the third source electrode 34 are coupled. The first passivation layer 16 is provided on the surfaces of the first source electrode 14, the first drain electrode 15, the first gate insulating layer 12, the first active layer 13, the third source electrode 34, the third drain electrode 35, and the third active layer 33. That is, the first passivation layer 16 covers at least partially each of the first source electrode 14, the first drain electrode 15, the first gate insulating layer 12, the first active layer 13, the third source electrode 34, the third drain electrode 35, and the third active layer 33. The first pixel electrode Pix1 is provided on the surface of the first passivation layer 16. The first passivation layer 16 comprises at least one first through-hole h1, which is configured to connect the first pixel electrode Pix1 and the first source electrode 14.

The second thin film transistor T2 comprises a second gate electrode, a second gate insulating layer, a second active layer, a second source electrode, a second drain electrode, and a second passivation layer. The second thin film transistor T2, the second pixel electrode Pix2, and the second common electrode C2 may be coupled in a similar manner as in the first thin film transistor T1. However, the second drain electrode and the third source electrode 34 are independent of each other, and are not coupled to each other. The second passivation layer comprises at least one second through-hole h2, which is configured to couple the second pixel electrode Pix2 and the second drain electrode.

The output terminal of the discharge device and the first common electrode C1 constitute the first charge-receiving device. In some embodiments, the first charge-receiving device comprises a first capacitor, and in particular, a first shunt capacitor Cd1. The output terminal of the discharge device and the second common electrode C2 constitute the second charge-receiving device. In some embodiments, the second charge-receiving device comprises a second capacitor, and in particular, a second shunt capacitor Cd2. In some embodiments, for example, as shown in FIGS. 1 and 2, the first shunt capacitor Cd1 is provided between the first common electrode C1 and the third drain electrode 35. The second shunt capacitor Cd2 is provided between the second common electrode C2 and the third drain electrode 35. This requires that the third drain electrode 35 form two branches. In the first branch, an orthographic projection of the third drain electrode 35 on the base substrate 01 overlaps at least partially with the orthographic projection of the first common electrode C1 on the base substrate 01. In the second branch, the orthographic projection of the third drain electrode 35 on the base substrate 01 overlaps at least partially with the orthographic projection of the second common electrode C2 on the base substrate 02. The first gate insulating layer 12 is provided between the first common electrode C1 and the third drain electrode 35. The first gate insulating layer 12 is provided between the second common electrode C2 and the third drain electrode 35.

Figure 4:
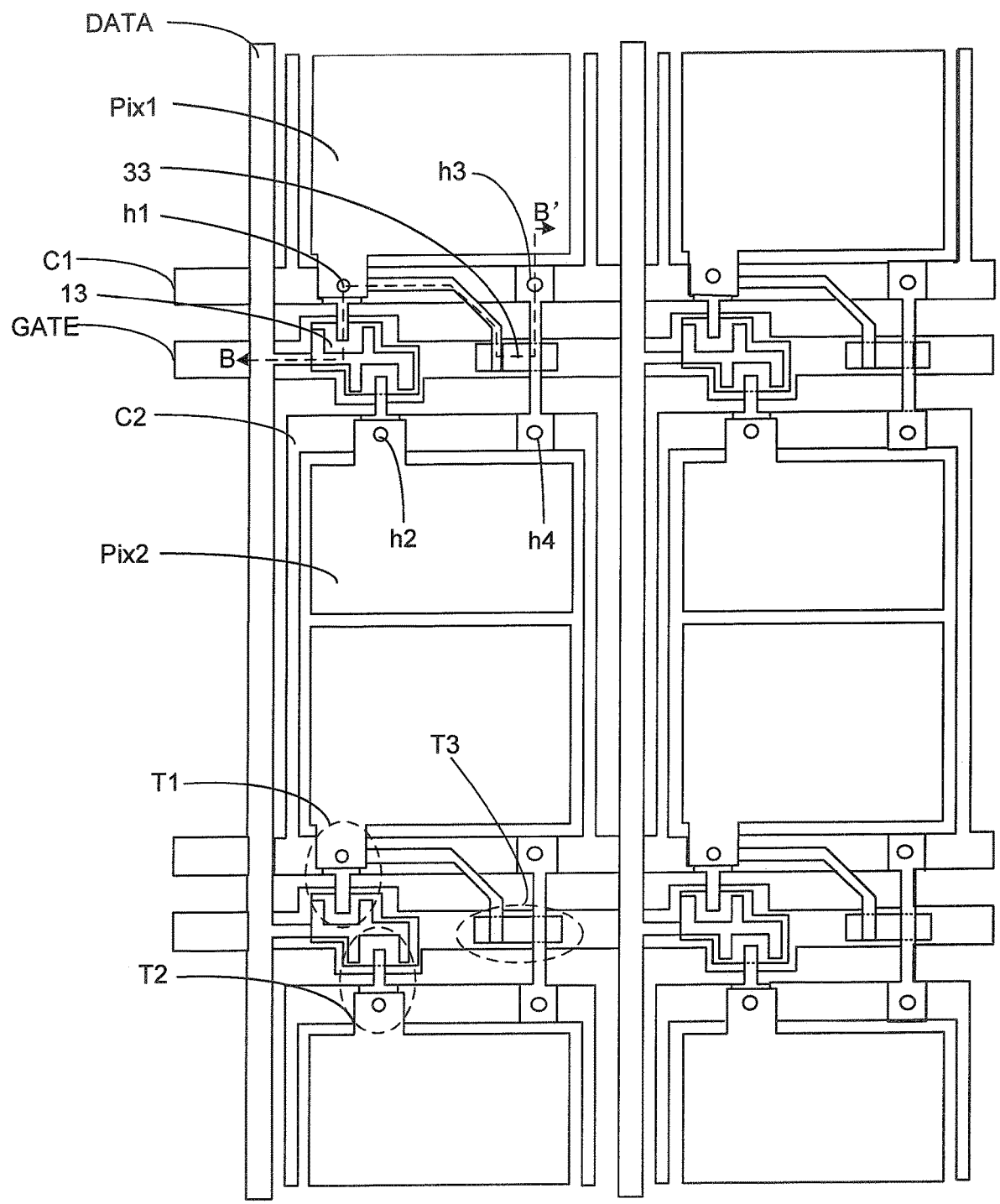
FIG. 4 shows a schematic diagram of a top view of a pixel structure according to another embodiment of the present disclosure.
Figure 6:
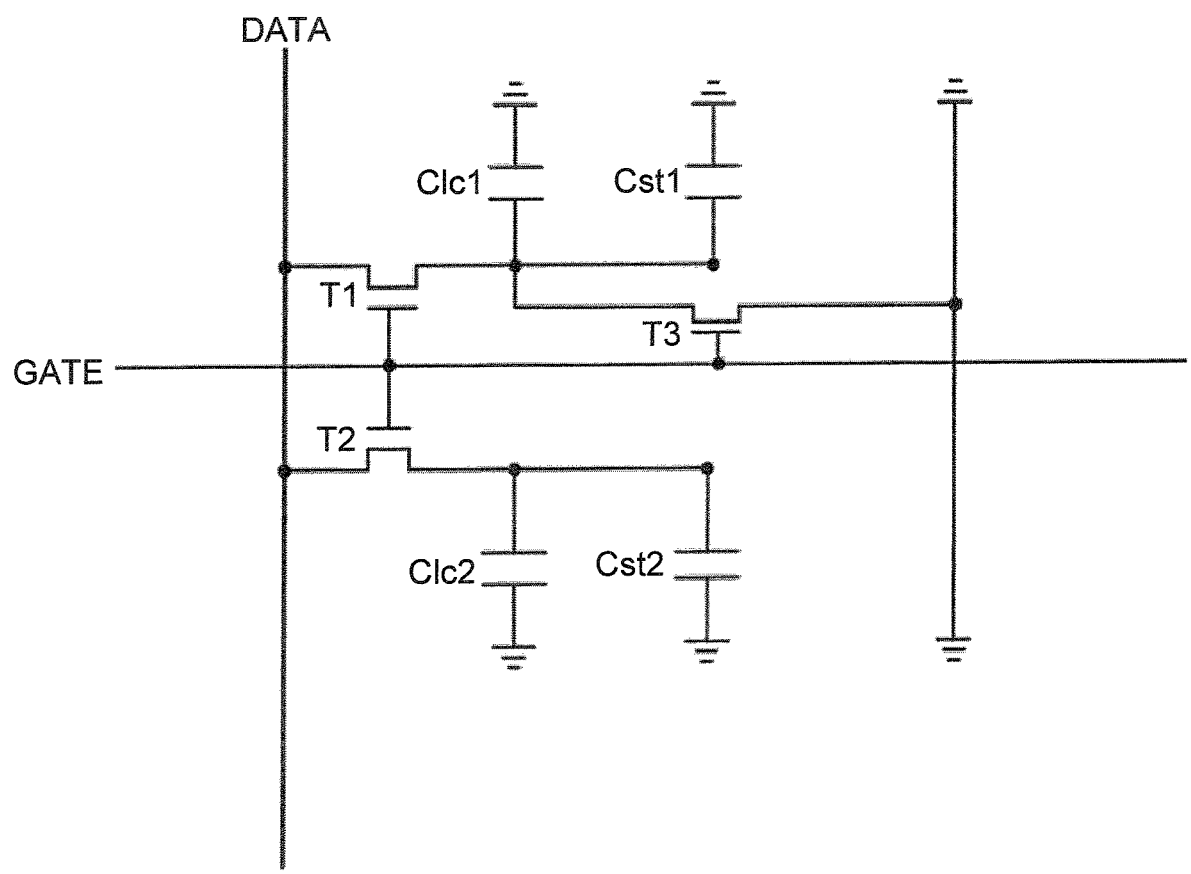
FIG. 6 shows a circuit diagram for a pixel structure according to another embodiment of the present disclosure.

FIGS. 4 to 6 show schematic diagrams and a circuit diagram of a pixel structure according to another embodiment of the present disclosure. FIG. 4 shows a schematic diagram of a top view of a pixel structure according to another embodiment of the present disclosure. FIG. 5 shows a schematic cross-sectional diagram of the embodiment illustrated in FIG. 4 along the line B-B'. FIG. 6 shows a circuit diagram for a pixel structure according to that embodiment.

As shown in FIGS. 4 to 6, the output terminal of the discharge device is electrically coupled to the first common electrode C1. The output terminal of the discharge device is electrically coupled to the second common electrode C2. The charge released by the first pixel electrode Pix1 flows into a loop along which the first common electrode C1 is located, and a loop along which the second common electrode C2 is located. The charge released by the first pixel electrode Pix1 helps maintain the relative pixel voltages of the first pixel electrode Pix1 and the second pixel electrode Pix2 until the next time the display refreshes.

A difference between the pixel structures according to the embodiment illustrated in FIGS. 1 to 3 and that according to the embodiment illustrated in FIGS. 4 to 6 is that, in the latter, the first gate insulating layer 12 comprises at least one third through-hole h3, and the fourth gate insulating layer comprises at least one fourth through-hole h4, for example, as shown in FIG. 4. The third drain electrode 35 is coupled to the first common electrode C1 through the thirst through-hole h3. The third drain electrode 35 is also coupled to the second common electrode C2 through the fourth through-hole h4.

Charge is not stored in a shunt capacitor. Rather, charge released by the first pixel electrode Pix1 is directed into a loop along which the first common electrode C1 is located and a loop along which the second common electrode C2 is located. The discharge device and the first thin film transistor T1 are therefore configured so that, in the "ON" state, the current flowing through the discharge device is smaller than the current flowing through the first thin film transistor T1. When gate line GATE is supplying scan signals, the first thin film transistor T1 will not be completely discharged, even though the discharge device remains in the "ON" state. The circuit diagram for a pixel structure according to this embodiment of the present disclosure is shown in FIG. 6.

As shown in FIGS. 1 and 2, the discharge device may be a third thin film transistor T3. The first thin film transistor T1 and the third thin film transistor T3 are configured so that, in the "ON" state, the current flowing through the first thin film transistor T1 is larger than the current flowing through the third thin film transistor T3. The relative current flows of the first and third thin film transistors T1, T3 may be controlled, for example, by adjusting the number of active layers in each thin film transistor, the thickness of each thin film transistor, the composition of the active layer(s) in each thin film transistor, and the like. As a result, the third thin film transistor T3 causes an amount of discharge per unit time from the first pixel electrode Pix1 that is less than the charge being charged into the first pixel electrode Pix1 through the first thin film transistor T1 per unit time.

The discharge device and the first thin film transistor T1 described above may also be incorporated into an embodiment of the pixel structure illustrated in FIGS. 1 to 3. In one embodiment (for example, as illustrated in FIG. 3), the released charge is stored in the first shunt capacitor Cd1 and the second shunt capacitor Cd2, while in the other embodiment (for example, as illustrated in FIG. 6), the released charge is directed into a loop along which the first common electrode C1 is located, and a loop along which the second common electrode C2 is located.

As shown in FIGS. 3 and 6, the first storage capacitor Cst1 is formed between the first gate electrode and the first drain electrode 15. The voltage of the first sub-pixel can be maintained until the next time the display refreshes.

When a pixel structure according to the present disclosure is incorporated into an array substrate, the common electrode on the first pixel electrode Pix1 and the color filter substrate constitute the liquid crystal capacitor of the first sub-pixel. The liquid crystal capacitor of the first sub-pixel is also referred to as the first liquid crystal capacitor Clc1.

The second storage capacitor Cst2 is formed between the second gate electrode and the second drain electrode. The voltage of the second sub-pixel can be maintained until the next time the display refreshes.

When a pixel structure according to the present disclosure is incorporated into an array substrate, the common electrode on the second pixel electrode Pix2 and the color filter substrate constitute the liquid crystal capacitor of the second sub-pixel. The liquid crystal capacitor of the second sub-pixel is also referred to as the second liquid crystal capacitor Clc2.

In addition, as shown in FIGS. 1 and 4, the first thin film transistor T1 and the second thin film transistor T2 may share a common active layer. That is, a common active layer may constitute both the first active layer 13 of the first thin film transistor T1 and the second active layer of the second thin film transistor T2. The first thin film transistor T1 and the second thin film transistor T2 may share a common source electrode. That is, a common source electrode may constitute both the first source electrode 14 of the first thin film transistor T1 and the second source electrode of the second thin film transistor T2.

In some embodiments, an orthographic projection of the gate line GATE on the base substrate 01 is between the orthographic projection of the first pixel electrode Pix1 on the base substrate 01 and the orthographic projection of the second pixel electrode Pix2 on the base substrate 01, for example, as shown in FIGS. 1, 2, 4, and 5. In some embodiments, the orthographic projection of the gate line GATE does not overlap with the orthographic projection of the first pixel electrode Pix1 or the orthographic projection of the second pixel electrode Pix2.

The first common electrode C1 comprises at least one first horizontal arm and at least one first vertical arm. The first horizontal arm extends in a direction parallel to an extension direction of the gate line GATE. The first vertical arm extends in a direction parallel to an extension direction of the data line DATA, for example, as shown in FIGS. 1 and 4.

In some embodiments, the first common electrode C1 comprises one first horizontal arm and two first vertical arms. The orthographic projections of the first horizontal arm and the two first vertical arms on the base substrate 01 form a U-shape. The orthographic projection of the first horizontal arm is between the orthographic projection of the gate line GATE on the base substrate 01 and the orthographic projection of the first pixel electrode Pix1 on the base substrate 01. The orthographic projection of the first pixel electrode Pix1 on the base substrate 01 is between the orthographic projections of the two first vertical arms on the base substrate 01.

The second common electrode C1 comprises at least one second horizontal arm and at least one second vertical arm. The second horizontal arm extends in a direction parallel to an extension direction of the gate line GATE. The second vertical arm extends in a direction parallel to an extension direction of the data line DATA.

In some embodiments, the second common electrode C2 comprises one second horizontal arm and two second vertical arms. The orthographic projections of the second horizontal arm and the two second vertical arms on the base substrate 01 form a U-shape. The orthographic projection of the second horizontal arm on the base substrate 01 is between the orthographic projection of the gate line GATE on the base substrate 01 and the orthographic projection of the second pixel electrode Pix2 on the base substrate 01. The orthographic projection of the second pixel electrode Pix2 on the base substrate 01 is between the orthographic projections of the two second vertical arms on the base substrate 01.

The first horizontal arm and the first pixel electrode Pix1 form the first storage capacitor Cst1. The first horizontal arm and the output terminal of the discharge device also form the first charge-receiving device.

The second horizontal arm and the second pixel electrode Pix2 form the second storage capacitor Cst2. The second horizontal arm and the output terminal of the discharge device also form the second charge-receiving device.

The output terminal of the discharge device according to the present disclosure comprises a main electrode, a first branch electrode, and a second branch electrode. The main electrode is coupled to the first branch electrode and the second branch electrode. The first branch electrode and the first common electrode C1 form a first charge-receiving device. The second branch electrode and the second common electrode C2 form a second charge-receiving device.

More particularly, the first branch electrode and the first horizontal arm of the first common electrode C1 form the first charge-receiving device. The second branch electrode and the second horizontal arm of the second common electrode C2 form the second charge-receiving device.

Thus, in the pixel structure according to the present disclosure, when the discharge device is a third thin film transistor T3, the third drain electrode 35 of the third thin film transistor T3 may be configured to comprise two branch electrodes. One of the two branch electrodes and the first common electrode C1 form the first charge-receiving device. The other of the two branch electrodes and the second common electrode C2 form the second charge-receiving device.

In some embodiments, the main electrode extends in a direction that is perpendicular to the extension direction of the gate line GATE. This can reduce coupling capacitance between the main electrode and the gate line GATE, and avoid the influence of excessive coupling capacitance on the discharge functions of the discharge device.

The present disclosure also provides a pixel control method.

In step S100, a gate line GATE couples the first thin film transistor T1 and the second thin film transistor T2, and turns on the discharge device.

In step S200, the first thin film transistor T1 charges the first pixel electrode Pix1. The second thin film transistor T2 charges the second pixel electrode Pix2. In addition, the discharge device is turned "on" when the first thin film transistor T1 and the second thin film transistor T2 are activated. Since the first thin film transistor T1, the second thin film transistor T2, and the discharge device are coupled to the same gate line GATE, they may be configured to act in a concerted manner, that is, discharge and/or charge simultaneously.

As shown in FIGS. 1 to 3, in the pixel structure according to an embodiment of the present disclosure, the first pixel electrode Pix1 discharges partial charge to the first charge-receiving device and the second charge-receiving device, through the first thin film transistor and the discharge device, as follows:

The first pixel electrode Pix1 discharges partial charge to the first shunt capacitor Cd1 and the second shunt capacitor Cd2 through the first thin film transistor T1 and the discharge device. The partial discharge is stored in the first shunt capacitor Cd1 and the second shunt capacitor Cd2.

As shown in FIGS. 4 to 6, in the pixel structure according to another embodiment of the present disclosure, the first pixel electrode Pix1 discharges partial charge to the first charge-receiving device and the second charge-receiving device, through the first thin film transistor T1 and the discharge device, as follows:

The first pixel electrode Pix1 discharges partial discharge to the first common electrode C1 and the second common electrode C2 through the first thin film transistor T1 and the discharge device. The partial discharge is released to the first common electrode C1 and the second common electrode C2.

The pixel structure according to embodiments of the present disclosure can prevent the first pixel electrode Pix1 from discharging completely, even though the discharge device remains turned on. Further, since the pixel voltage of the first pixel electrode Pix1 is allowed to be smaller than the pixel voltage of the second pixel electrode Pix2, the pixel structure according to the present disclosure can be used to produce a display device that is capable of wide angle viewings. In addition, the configurations of the pixel structure of the present disclosure make it possible to reduce the charge amount of the first charge-receiving device, These configurations allow charge to be partially released by the first sub-pixel, so as to reduce the amount of charge received by the first charge-receiving device between the discharge device and the first sub-pixel, which can reduce the effect of the first charge-receiving device on the pixel voltage of the first pixel electrode. This can in turn maintain the high quality of the display being generated.

The present disclosure also provides an array substrate. The array substrate comprises a pixel structure as described above, for example, as shown in FIGS. 1 and 4. The advantages of an array substrate incorporating a pixel structure of the present disclosure are as described above, and are not repeated here.

In some embodiments, to facilitate the fabrication of the array substrate, when the first common electrode C1 and the second common electrode C2 of the pixel structure comprise the at least one horizontal arm and the at least one vertical arm, for example, as shown in FIGS. 1 and 4, the array substrate comprises a plurality of pixel structures, and the plurality of pixel structures are arranged in an array.

More particularly, each row of pixel structures comprises a row of first sub-pixels and a row of second sub-pixels. In each row of pixel structures, the first sub-pixels of the pixel structures are arranged in one row, and the second sub-pixels of the pixel structures are arranged in another row. In adjacent rows of pixel structures in the same column, the row of first sub-pixels in one row of pixel structures is arranged to be adjacent to the row of second sub-pixels in the other row of pixel structures. In a row of first sub-pixels, the horizontal arms of the first common electrodes C1 of the pixel structures are coupled, so that during fabrication, the horizontal arms may be formed in a single patterning process.

In adjacent rows of pixel structures, the vertical arms of the first common electrodes C1 of the pixel structures in one row are coupled to the vertical arms of the second common electrodes C2 of the pixel structures in the adjacent row, so that during fabrication, the vertical arms may be formed in a single patterning process.

The present disclosure also provides a display device. The display device may comprise an array substrate as described above. The advantages of a display device incorporating an array substrate of the present disclosure are as described above, and are not repeated here.

The display device according to the present disclosure may be integrated into, for example, a mobile phone, a tablet, a television, a computer, a display, a notebook computer, a digital photo frame, a navigation system, and any other products or components that provide a display function.

Unlike conventional technologies, in the pixel structure of the present disclosure, the gate electrode of the first thin film transistor, the gate electrode of the second thin film transistor, and the control terminal of the discharge device are coupled to the same gate line. The output terminal of the discharge device and the first common electrode form a first charge-receiving device. The output terminal of the discharge device and the second common electrode form a second charge-receiving device. When the pixel structure is being charged, under the control of scan signals from the same gate line, the first and second thin film transistors are activated to be in a conducting state, and the discharge device is turned on. These concerted actions of the first thin film transistor and the discharge device induce the first pixel electrode to discharge partial charge to the first and second charge-receiving devices, so that the pixel voltage of the first pixel electrode is smaller than the pixel voltage of the second pixel electrode. The configurations of the pixel structure of the present disclosure make it possible to reduce the charge amount of the first charge-receiving device, and reduce the effect of the first charge-receiving device on the pixel voltage of the first pixel electrode, which can in turn maintain the high quality of the display being generated.

In the description of the specification, references made to the term "some embodiment," "some embodiments," and "exemplary embodiments," "example," and "specific example," or "some examples" and the like are intended to refer that specific features and structures, materials or characteristics described in connection with the embodiment or example that are included in at least some embodiments or example of the present disclosure. The schematic expression of the terms does not necessarily refer to the same embodiment or example. Moreover, the specific features, structures, materials or characteristics described may be included in any suitable manner in any one or more embodiments or examples. In addition, for a person of ordinary skill in the art, the disclosure relates to the scope of the present disclosure, and the technical scheme is not limited to the specific combination of the technical features, and also should covered other technical schemes which are formed by combining the technical features or the equivalent features of the technical features without departing from the inventive concept. What is more, the terms "first" and "second" are for illustration purposes only and are not to be construed as indicating or implying relative importance or implied reference to the quantity of indicated technical features. Thus, features defined by the terms "first" and "second" may explicitly or implicitly include one or more of the features. In the description of the present disclosure, the meaning of "plural" is two or more unless otherwise specifically and specifically defined.

The principle and the embodiment of the present disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. A pixel structure, comprising:
   a first sub-pixel comprising a first thin film transistor, a first common electrode, and a first pixel electrode that is coupled to the first thin film transistor;
   a second sub-pixel comprising a second thin film transistor, a second common electrode, and a second pixel electrode that is coupled to the second thin film transistor;
   a discharge device comprising a control terminal, an input terminal, and an output terminal; and
   a gate line,
   wherein the first thin film transistor, the second thin film transistor, and the control terminal of the discharge device are coupled to the gate line,
   the gate line is configured to control the first thin film transistor, the second thin film transistor, and the discharge device to operate in a concerted manner,
   a pixel voltage of the first pixel electrode is configured to be smaller than a pixel voltage of the second pixel electrode,
   the output terminal of the discharge device is electrically coupled to the first common electrode to form a first charge-receiving device,
   the output terminal of the discharge device is electrically coupled to the second common electrode to form a second charge-receiving device, and
   the pixel structure is configured to cause the first pixel electrode to discharge partially to the first charge-receiving device and the second charge-receiving device.

2. The pixel structure according to claim 1, wherein the discharge device is a third thin film transistor.

3. The pixel structure according to claim 1,
   wherein the first charge-receiving device is a first shunt capacitor, and
   wherein the second charge-receiving device is a second shunt capacitor.

4. The pixel structure according to claim 3,
   wherein the first sub-pixel further comprises a liquid crystal capacitor, and
   wherein a sum of a capacitance of the first shunt capacitor and a capacitance of the second shunt capacitor is smaller than a capacitance of the liquid crystal capacitor.

5. The pixel structure according to claim 3, wherein a capacitance of the first shunt capacitor is the same as a capacitance of the second shunt capacitor.

6. The pixel structure according to claim 1, wherein an on-current of the first thin film transistor is greater than an on-current of the discharge device.

7. The pixel structure according to claim 1,
   wherein the first thin film transistor is coupled to the gate line via a first gate electrode of the first thin film transistor, and
   wherein the second thin film transistor is coupled to the gate line via a second gate electrode of the second thin film transistor.

8. The pixel structure according to claim 1, wherein an input terminal of the first thin film transistor and an input terminal of the second thin film transistor are coupled to a same signal line of the pixel structure.

9. The pixel structure according to claim 8,
   wherein each of the first common electrode and the second common electrode comprises at least one horizontal arm and at least one vertical arm,
   wherein the at least one horizontal arm extends in a direction parallel to an extension direction of the gate line, and
   wherein the at least one vertical arm extends in a direction parallel to an extension direction of the signal line.

10. The pixel structure according to claim 9,
    wherein the output terminal of the discharge device is electrically coupled to the at least one horizontal arm of the first common electrode to form a first charge-receiving device, and
    wherein the output terminal of the discharge device is electrically coupled to the at least one horizontal arm of the second common electrode to form a second charge-receiving device.

11. The pixel structure according to claim 1, further comprising a first insulating layer between the output terminal of the discharge device and the first common electrode, and a second insulating layer between the output terminal of the discharge device and the second common electrode.

12. The pixel structure according to claim 1, wherein the gate line, the first common electrode, and the second common electrode are each composed of a metal material selected from the group consisting of copper, aluminum, molybdenum, titanium, chromium, tungsten, and an alloy thereof.

13. An array substrate, comprising the pixel structure according to claim 1.

14. The array substrate according to claim 13,
    wherein the array substrate comprises a plurality of the pixel structures arranged in rows, and
    wherein in each row of the pixel structures, the first sub-pixels of the pixel structures are arranged in one row, and the second sub-pixels of the pixel structures are arranged in another row.

15. The array substrate according to claim 14, wherein the pixel structures are arranged so that in a column, the first sub-pixels in one row of the pixel structures are adjacent to the second sub-pixels in the adjacent row of the pixel structures.

16. A display device, comprising the array substrate according to claim 13.

17. A method of controlling the pixel structure according to claim 1, the method comprising:
- activating the first thin film transistor and the second thin film transistor into a conducting state, and turning on the discharge device;
- charging the first pixel electrode and the second pixel electrode using the first thin film transistor and the second thin film transistor, respectively; and
- causing the first pixel electrode to discharge partially to a first charge-receiving device and a second charge-receiving device, so that the pixel voltage of the first pixel electrode is smaller than the pixel voltage of the second pixel electrode.

18. The method according to claim 17, the method further comprising storing the partial discharge from the first pixel electrode in the first charge-receiving device and the second charge-receiving device.

19. The method according to claim 17, the method further comprising releasing the partial discharge from the first pixel electrode to the first common electrode and the second common electrode.

* * * * *